Figure 1:
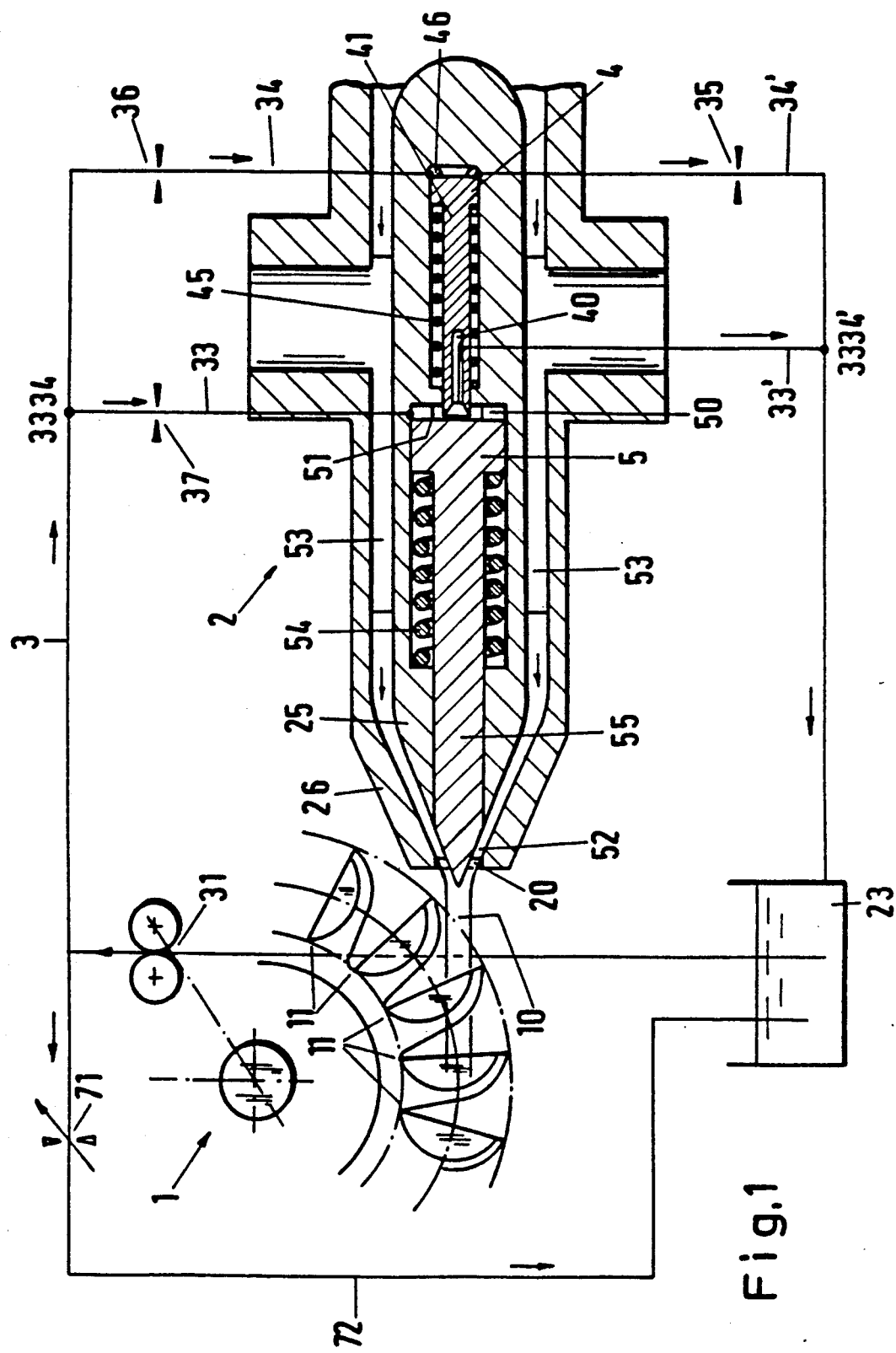

United States Patent [19]

Wuehrer

[11] Patent Number: 5,066,191
[45] Date of Patent: Nov. 19, 1991

[54] TURBINE WITH CONTROL SYSTEM

[75] Inventor: Wolfgang Wuehrer, Ravensburg, Fed. Rep. of Germany

[73] Assignee: Sulzer Brothers Limited, Winterthur, Switzerland

[21] Appl. No.: 392,938

[22] PCT Filed: Nov. 11, 1989

[86] PCT No.: PCT/CH88/00209
§ 371 Date: Jul. 13, 1989
§ 102(e) Date: Jul. 13, 1989

[87] PCT Pub. No.: WO89/05402
PCT Pub. Date: Jun. 15, 1989

[30] Foreign Application Priority Data

Nov. 30, 1987 [CH] Switzerland ............... 4664/87

[51] Int. Cl.⁵ ............................................. F04D 15/02
[52] U.S. Cl. ..................................... 415/35; 415/178; 239/459; 251/28
[58] Field of Search ............... 415/30, 35, 202, 177, 415/178; 92/150, 151; 239/437, 451, 453, 456, 459, 569, 533.1; 251/28, 29

[56] References Cited

U.S. PATENT DOCUMENTS

| 1,706,812 | 3/1929 | Pfau | 415/35 |
| 3,478,689 | 11/1969 | Ball | 415/175 |
| 3,880,051 | 4/1975 | Eppler | 92/151 |
| 4,083,649 | 4/1978 | Miller et al. | 415/178 |
| 4,460,313 | 7/1984 | Austrem | 415/175 |
| 4,714,402 | 12/1987 | Ichikawa | 415/35 |

FOREIGN PATENT DOCUMENTS 249480 4/1948 Switzerland ............... 239/459

Primary Examiner—John T. Kwon
Attorney, Agent, or Firm—Kenyon & Kenyon

[57] ABSTRACT

The turbine (1) has a control and regulating system with a pump (31), the pressure of which changes proportionally to the second power of the flow delivered by the pump or to the second power of the speed ($n^2$) of the turbine (1). The hydraulic follow-up piston arrangement with the pilot piston (41) and the control piston (5) for regulating the speed of the turbine, is fed by this only pump (31), which permits a particularly compact and space-saving construction. The turbine can be used as a motor or drive in applications other than the generating of electricity, such as, for example, for rope winches.

15 Claims, 2 Drawing Sheets

TURBINE WITH CONTROL SYSTEM

The invention relates to a turbine with a control and regulating system.

Control and regulating systems for turbines serve to keep the speed constant independent of the load. For turbines, in particular also for water-operated Pelton turbines, for example, so-called needle valves are frequently used, wherein a conical needle moves axially in a tube-like counterpart, so that a greater or lesser quantity of water is let through by which the power output of the turbine can be adapted to the respective requirements.

Regulated turbines of the described type are used mainly as a drive for generators, i.e. for generating electricity. With this application very precise regulation is required, which in the event of changes in the load, i.e. the switching on and off of electrical appliances by consumers, adapts the power output of the turbine practically without changing its speed. In this connection we speak of the statics of the turbine regulating system. The smaller the statics of a turbine regulating system, the more the speed of a turbine will be kept constant during changes in the load. Regulating systems with small statics are complicated and, therefore, expensive to produce.

If a turbine is used to drive, for example, a rope winch, it is also desirable to regulate the speed or power output of the turbine within certain limits. However, here one can dispense with the small statics which are absolutely essential for generating electricity.

It is an object of this invention to provide a turbine, the regulating and control of which is adequate for machines which do not generate electricity.

According to the invention such a turbine is characterized in that the hydraulic control and regulating system comprises a follow-up piston arrangement with a pilot piston and a control piston, as well as a hydraulic pump which produces a pressure which is dependent on the speed of the turbine, in that the delivery of the pump is passed at least partly through a first branch with the pilot piston and through a parallel, second branch with the control piston of the control and regulating system for the nozzle, and in that each of the two branches has at least one orifice plate.

The invention permits a particularly simple and, therefore, also economical construction of the turbine drive, and has regulating properties which suffice for applications other than the generating of electricity. Furthermore, the invention permits, for example, the compact construction of a turbine with an internal type control valve, wherein, for example, the needle valve, with the controlled and regulated follow-up piston drive, i.e. the control servo, are arranged in the flow of motive water of the turbine. A control servo of the follow-up piston type permits the construction of a practically hysteresis-free regulating and control system, since possible friction influences which could delay the axial displacements can be largely eliminated with this.

With a small turbine it may be advantageous if the housings of the turbine and pump or gear mechanism are flanged directly together in the compact construction. The wall between the turbine chamber and the pump or gear chamber is in this case touched by water on the turbine side and by air on the other side. In principle, the risk exists that water of condensation could form in the gear or pump chamber. If the wall is constructed as a cooling wall with channels for the oil supplied by the pump, the formation of water of condensation is prevented, because in this case the gear or pump chamber will not have a low temperature zone where water of condensation could form. At the same time the flow of oil supplied by the gear unit or pump is cooled in by giving off its heat in the turbine chamber and, in particular, to the turbine water.

The use of such a turbine as a drive for a winch is particularly advantageous in the mining industry, especially in underground mines. Such a turbine drive is per sé explosion-proof and does not produce noxious waste gases. The drive medium water is also required elsewhere in the mines, for example for cooling purposes or for washing the mined material. The height of fall of the water resulting from the depth of the shaft, gallery or pit is available as an inexpensive, practically free source of energy for driving the turbine. The available water pressure may amount to between a few bar to as much as 200 bar or more. The compactness and simplicity of the turbine with the control system also permits its use as a drive or motor for machines used in changing locations. In the mining industry, the mechanical equipment, e.g. rope winches for stripping machines, so-called ore scrapers, must from time to time be moved up in an advancing gallery. Under difficult underground conditions, even the smallest saving in mass and/or reduction in size of the equipment may already offer significant advantages. Thus, for example, a turbine drive with the power output from about 20 kW to 60 kW may only weigh about one third of the mass of about 300 kg of an explosion-proof electric motor with the same power output. This provides considerable advantages in the handling of the equipment operated with such turbines, e.g. winches.

Figure 2:
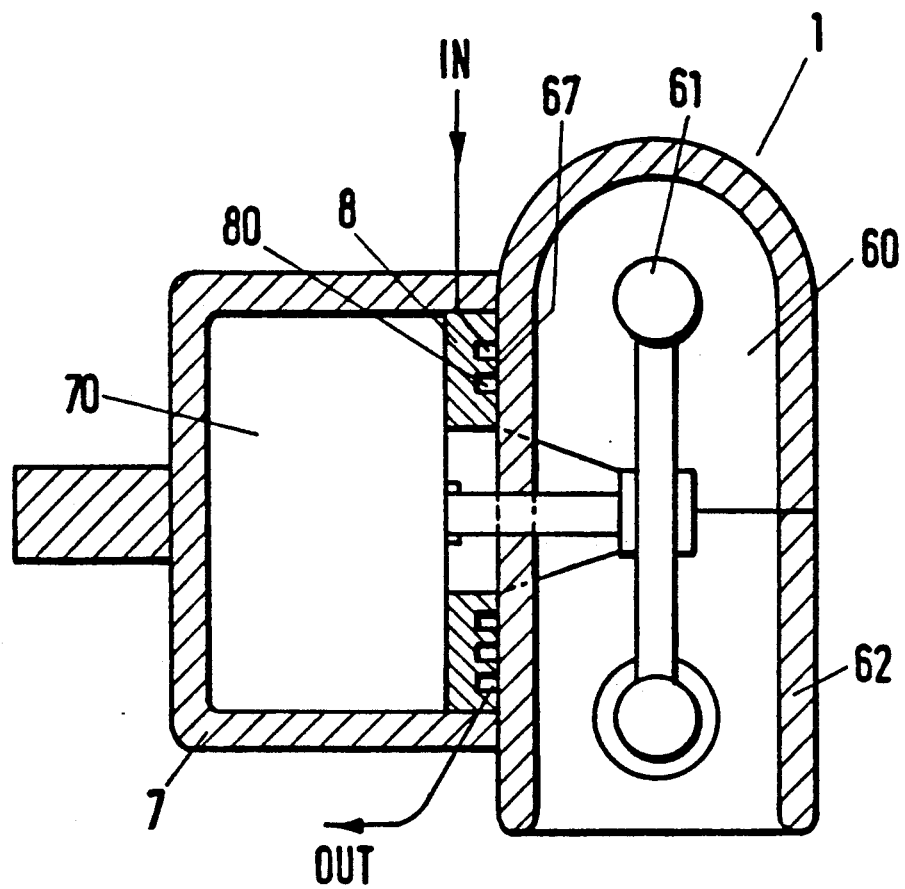

These and other objects and advantages of the invention will become more apparent from the following detailed description taken in conjunction with the accompanying drawings wherein:

FIG. 1 illustrates a part cross-sectional schematic view of a Pelton turbine with a needle valve and hydraulic regulating and control system in accordance with the invention; and FIG. 2 diagrammatically in section, illustrates a Pelton turbine with a flanged-on gear or pump housing, with a dividing wall constructed as a cooling wall in accordance with the invention.

The Pelton turbine 1 has a plurality of circumferentially disposed blades 11 driven by a water-jet 10 which comes out of a nozzle 20 of a needle valve 2. The control and regulating of the power output or speed of the turbine 1 is ensured by a hydraulic regulating and control system 3. In the example, the needle valve 2 is mounted on the inside. A pump 31, e.g. a volumetrically delivering geared pump, is driven by the turbine 1 via a gear unit (not illustrated), and supplies oil from a tank 23 through the system 3, which at a point 3334 splits into two branches 33 and 34. The branch 33 leads to a piston chamber 50 behind a control piston 5 and the branch 34 (the actual measuring circuit) to a piston chamber 46 behind a pilot piston 4. The hydraulic oil flows through return lines 33' and 34', respectively, which again combine at a point 3334', back into the tank 23. Orifice plates 35, 36 are provided in the branch lines 34, 34' for throttling the oil flow while a single orifice plate 37 is provided in the branch line 33, 33'. A second orifice is formed in this branch 33, 33' by a piston rod 41 with an axial bore 40 and an opposite end face 51 of the control piston 5, i.e. by the gap which lies inbetween. In the illustrated example, the end of a piston rod 55 is constructed as a nozzle needle 52 of the needle valve 2.

The pilot piston 4 and control piston 5 are guided and arranged in a common housing 25 which is provided on the outside with, for example, three webs 53 (only two are shown) by which the housing 25 is positioned and held in this position in a needle valve housing 26 in the flow of motive water. The hydraulic lines may, for example, pass through these webs. One coil spring each, 54 and 45, press the control piston 5 and the pilot piston 4, respectively, towards the rear into their starting position.

The control and regulating system for regulating the turbine speed operates as follows: At a specific speed, the pump 31 produces a pressure in the hydraulic circuit which is proportional to the second power of the speed n ($p \sim n^2$). In branches of the hydraulic system 3 there occurs - on the whole - a drop in pressure of the same magnitude. The orifice plate or throttle 35 in the branch 34, 34' ensures that, seen in the direction of flow, a pressure builds up in front thereof.

In the same way, pressure also builds up in front of the orifice plate 36. The pair of orifice plates 35, 36 in the branch 34, 34' act as a pressure divider, and thus determine the magnitude of the pressure which in the piston chamber 46 acts on the end face of the piston 4.

In the branch 33, 33' the orifice plate or throttle 37 and the annular orifice which is formed by the end face 51 and the piston rod 41 with the bore 40 open on the side of the end face, act as a pressure divider.

As the speed n of the turbine 1 increases, the pressure (measuring pressure) in the piston chamber 46 increases and presses and moves the pilot piston 4 by way of the pilot piston rod 41 against the pressure or the force of the spring 45 in the direction of the control piston 5, so that the gap of the annular orifice becomes smaller. Now the pressure in the piston chamber 50 increases and the control piston 5 is moved in the direction of the nozzle 20 against the pressure of the spring 54 and the axial forces exerted by the motive water on the piston rod 55. As a result thereof, the open cross-section of the nozzle 20 is reduced, the driving water jet 10 becomes smaller and the speed n of the turbine 1 also drops. This again causes the pressure in the piston chamber 46 of the pilot piston 4 to drop, and the pilot piston 4 with the pilot piston rod 41 moves away from the control piston 5 into a new equilibrium position. As a result thereof, the annular orifice between the piston chamber 50 and the bore 40 becomes larger, which causes a drop in pressure in the piston chamber 50, and the piston 5 follows the pilot piston 41. Due to this, the cross-section of the nozzle 20 open for the motive water becomes larger, which now causes an increase in the speed n of the turbine 1. Every load or speed change of the turbine 1 immediately results in such a regulating operation, wherein for every speed n of the turbine 1 at a specific load and a spring with a specific spring constant, the needle 52 finally assumes a very specific equilibrium position, or the needle 52 is regulated to this position.

By dimensioning measures which are known to the expert, it is easily possible to dimension the control and regulating system in such a way that this does not oscillate. The spring constant of the springs 45 and 54, for example, determine to a large extent the statics of the regulation. The regulating properties may, for example, also be improved when the flow, i.e. the throughflow in the branch 34, 34' of the pilot piston 4, is chosen greater than the flow in the branch 33, 33' of the control piston 5.

To practically eliminate axial forces of the hydraulic liquid in the branch 33, 33' on the piston 4 rod 41 of the pilot piston, the bore 40 in the piston rod 41 may taper down towards the inside, e.g. conically, or may be provided with a step, and on the outside in the piston chamber 50 the piston rod 41 may have a cylindrical shape.

In the arrangement described in the foregoing the turbine 1, at a given pressure of the motive water, is designed for a specific speed n. The adjusting and changing of the nominal speed at the same pressure of the motive water can be effected very easily by means of a third branch 72, a bypass with valve 71 in the hydraulic pump circuit. Depending on the regulating accuracy, it is also possibly to supply the lubrication for the turbine 1 and for the non-illustrated gear unit of the pump 31 of the control and regulating system, by way of a lubricating branch. Such measures aid a compact construction of the turbine 1 with the control and regulating system. The use of two orifice plates in each branch of the hydraulic control and regulating circuit ensures good regulating properties. However, there are also cases where a sufficiently good regulation can already be obtained with just one orifice plate in each branch.

With Pelton turbines 1 which reach speeds of several thousands of revolutions per minute it is necessary to reduce the speed on the driven side by means of a gear unit. If the gear unit must be cooled, provision may be made to pass the oil in the hydraulic circuit through a cooler which is not illustrated here. The oil in the control and regulating circuit may, if required, also be passed through and cooled by this cooler. Although the example relates to a Pelton turbine with a needle valve for the nozzle, other turbine types and their control systems may also be used.

Referring to FIG. 2, the turbine 1 with a Pelton wheel in a turbine housing chamber 60 in a turbine housing 62, has a gear and/or pump housing 71 fastened directly to a wall 67 of turbine 6. A plate 8 with the channels 80 and the wall 67 of the turbine housing 62 form a cooler for the liquid delivered by a pump, which is not illustrated here, and/or of a gear unit in the gear housing or pump housing chamber 70. As a result thereof, the gear housing or pump housing chamber 70 does not have a zone with a considerably lower temperature, which is greatly cooled by the turbine water and in which water of condensation could form. The surface of the cooler 67, 8, 80 facing the pump housing or gear housing chamber 70 is adequately heated by the to be cooled flow of warm liquid.

This cooler could, of course, also be designed as part of one of the housings 6 or 7. Whatever construction is chosen, all that is important is that during operation no low temperature zone is formed in the gear housing or pump housing chamber 70, where water of condensation can form.

I claim:
1. In combination,
   a turbine having a plurality of circumferentially disposed blades;
   a needle valve for directing a water jet onto said blades for rotating said turbine, said valve including a first housing having a nozzle at one end for expelling a water jet therefrom, a control piston slidably mounted in said housing to control the water jet passing through said nozzle, a first chamber behind said piston relative to said nozzle, a pilot piston slidably mounted in said housing coaxially of said control piston, and a second chamber behind said pilot piston relative to said nozzle;

a hydraulic pump drivingly connected to said turbine to be driven thereby for pumping a flow of oil therethrough at a pressure dependent on the speed of said turbine;

a first branch line between said pump and said first chamber for delivering oil thereto;

a first orifice plate in said first branch line to throttle the flow of oil therethrough;

a second branch line between said pump and said second chamber for delivering oil thereto; and a second orifice plate in said second branch line to throttle the flow of oil therethrough.

2. The combination as set forth in claim 1 wherein said control piston has a piston rod projecting into said nozzle.

3. The combination as set forth in claim 1 wherein said pilot piston has a piston rod extending into said first chamber to define an annular space in communication with said first branch line.

4. The combination as set forth in claim 3 wherein said piston rod has an axial bore communicating with said first chamber, said bore having a tapered portion disposed in said first chamber and which further comprises a third branch line extending from said bore to exhaust oil therefrom.

5. The combination as set forth in claim 1 wherein said pump produces a pressure proportional to the second power of the speed of said turbine.

6. The combination as set forth in claim 1 wherein said pump is a volumetrically delivering geared pump.

7. The combination as set forth in claim 1 which further comprises a spring for biasing said pilot piston towards said second chamber.

8. The combination as set forth in claim 1 wherein each branch line has a pair of said orifice plates therein.

9. The combination as set forth in claim 1 wherein said turbine has a housing about said blades and a plurality of channels in said turbine housing for conducting the flow of oil therethrough in heat exchange relation with an interior of said turbine housing.

10. The combination as set forth in claim 9 which further comprises a plate secured to a wall of said turbine housing and having said channels therein.

11. The combination as set forth in claim 9 wherein said pump has a housing secured to said turbine housing in an area of said channels.

12. The combination as set forth in claim 11 wherein said channels are disposed at a wall of said turbine housing contacted by water passing from said blades.

13. The combination as set forth in claim 1 wherein said needle valve includes a second housing having said control piston and said pivot position slidably mounted therein, said second housing being spaced concentrically within said first housing to define a flow path for water therebetween.

14. In combination, a turbine for driving a rope winch, said turbine having a plurality of circumferentially disposed blades;

a valve including a housing having a nozzle at one end for directing a water jet onto said blades, a control piston slidably mounted in said housing to control the water jet passing through said nozzle, a first chamber behind said piston relative to said nozzle, a pilot piston slidably mounted in said housing coaxially of and in contact with said control piston, and a second chamber behind said pilot piston relative to said nozzle;

a hydraulic pump drivingly connected to said turbine for pumping a flow of oil therethrough at a pressure dependent on the speed of said turbine;

a pair of branch lines extending in parallel from said pump to said respective chambers for delivering a pressurized flow of oil thereto; and at least one orifice plate in each branch line to throttle the flow of oil therethrough whereby in response to an increase in oil pressure in the said chambers, said water jet decreases in size to reduce the speed of said turbine.

15. The combination as set forth in claim 14 which further comprises a pair of springs biasing said respective pistons towards said respective chambers whereby in response to a decrease in oil pressure in said chambers, said water jet increases in size to increase the speed of said turbine.

* * * * *

UNITED STATES PATENT AND TRADEMARK OFFICE
CERTIFICATE OF CORRECTION

PATENT NO.  :   5,066,191

DATED       :   November 19, 1991

INVENTOR(S) :   Wuehrer

It is certified that error appears in the above-identified patent and that said Letters Patent is hereby corrected as shown below:

Column 2, line 55, change "inside. A pump" to --inside.
¶ A pump--.

Column 2, line 58, change "at a" to --at one--.

Column 3, line 19, change "In" to --In the--.

Signed and Sealed this

Fifth Day of April, 1994

Attest:

BRUCE LEHMAN

Attesting Officer

Commissioner of Patents and Trademarks